United States Patent [19]

Kudo et al.

[11] Patent Number: 5,563,861
[45] Date of Patent: Oct. 8, 1996

[54] OPTICAL DISC RECORDING APPARATUS WHICH CONTROLS RE-RECORDING AFTER A DISTURBANCE AS A FUNCTION OF THE FREQUENCY OF THE DETECTED DISTURBANCE

[75] Inventors: Junichi Kudo, Tokyo; Ryosuke Senoguchi, Kanagawa, both of Japan

[73] Assignee: Sony Corporation, Tokyo, Japan

[21] Appl. No.: 438,986

[22] Filed: May 11, 1995

Related U.S. Application Data

[63] Continuation of Ser. No. 18,765, Feb. 17, 1993, abandoned.

[30] Foreign Application Priority Data

Feb. 29, 1992 [JP] Japan ................................ 4-078842

[51] Int. Cl.⁶ .................................................. G11B 7/00
[52] U.S. Cl. ............................ 369/54; 369/44.32; 369/58
[58] Field of Search ........................... 369/54, 58, 44.32, 369/59, 33

[56] References Cited

U.S. PATENT DOCUMENTS

| | | | |
|---|---|---|---|
| 4,536,864 | 8/1985 | Van Rosmalen | 369/60 X |
| 4,796,247 | 1/1989 | Vogelsang | 369/44.32 X |
| 4,982,390 | 1/1991 | Tanaka | 369/30 |
| 5,014,136 | 5/1991 | Sakai et al. | 358/341 |
| 5,032,930 | 7/1991 | Suetaka et al. | 358/342 |
| 5,042,019 | 8/1991 | Kitai et al. | 369/32 |
| 5,212,678 | 5/1993 | Roth et al. | 369/60 |
| 5,214,631 | 5/1993 | Maeda et al. | 369/59 |
| 5,224,087 | 6/1993 | Maeda et al. | 369/54 |
| 5,243,587 | 9/1993 | Itoh et al. | 369/48 |
| 5,243,588 | 9/1993 | Maeda et al. | 369/54 |
| 5,289,440 | 2/1994 | Bakx | 369/32 |

FOREIGN PATENT DOCUMENTS

| | | |
|---|---|---|
| 82643/91 | 2/1992 | Australia . |
| 0138246A2 | 4/1985 | European Pat. Off. . |
| 0367094A2 | 5/1990 | European Pat. Off. . |
| 0420211A3 | 4/1991 | European Pat. Off. . |
| 0465053A2 | 1/1992 | European Pat. Off. . |
| 0485234A2 | 5/1992 | European Pat. Off. . |

OTHER PUBLICATIONS

Sony Corporation, *Mini Disc System Technical Manual*, Mar. 1992, Tokyo, Japan.
Patent Abstracts of Japan, Group No. P913; vol. 13, No. 353 published Aug. 8, 1989, and 001–112 573.

*Primary Examiner*—Aristotelis Psitos
*Assistant Examiner*—Duncan Wilkinson
*Attorney, Agent, or Firm*—Limbach & Limbach L.L.P.; Alan S. Hodes

[57] ABSTRACT

An optical recording apparatus includes a memory, a recording device, a detector and a controller. The memory stores input data in sequence at a first transmission rate, reads out the stored input data at a second transmission rate which is faster than the first transmission rate, and outputs the data read at the second transmission rate as a recording data in predetermined data units. The recording device adds a cluster connecting sector with a data length long enough to cover a distance to rearrange data through interleaving before and after the recording data in the predetermined data unit and or recording the interleaved data on an optical disc. The detector detects an abnormality of the recording operation and outputs an output signal as an abnormality detected result. The controller controls re-recording by the recording device corresponding to an output signal from the detector within a predetermined period thereafter which is chosen to ensure a sufficient buffer capacity in the memory to store inputted data during re-recording after a detected abnormality.

6 Claims, 14 Drawing Sheets

| 1 BYTE | | | |
|---|---|---|---|
| 00H | FFH | FFH | FFH |
| FFH | FFH | FFH | FFH |
| FFH | FFH | FFH | 00H |
| MINUTE | SECOND | BLOCK | MODE |
| D0001 | D0002 | D0003 | D0004 |
| D0005 | D0006 | D0007 | D0008 |
| D0009 | D0010 | D0011 | D0012 |
| ... | ... | ... | ... |
| D2329 | D2330 | D2331 | D2332 |
| D2333 | D2334 | D2335 | D2336 |

FIG. 6
PRIOR ART

| D0001 FILE NUMBER | D0002 CHANNEL NUMBER | D0003 SUBMODE | D0004 DATA TYPE |
|---|---|---|---|
| D0005 FILE NUMBER | D0006 CHANNEL NUMBER | D0007 SUBMODE | D0008 DATA TYPE |

FIG. 7
PRIOR ART

OPTICAL DISC RECORDING APPARATUS WHICH CONTROLS RE-RECORDING AFTER A DISTURBANCE AS A FUNCTION OF THE FREQUENCY OF THE DETECTED DISTURBANCE

This is a continuation of application Ser. No. 08/018,765 filed on Feb. 17, 1993 which is now abandoned.

BACKGROUND

1. Field of the Invention

The present of the invention relates to an optical disc recording apparatus. More particularly, the present invention relates to recording continuous digital signals which are compressed before recording on an optical disc.

2. Background of the Invention

In a conventional optical disc recording and/or reproducing apparatus, information signals recorded on an optical disc are read out by an optical head. An output signal from the optical head is sequentially processed in real time and outputted as a reproducing signal. On the other hand, in the conventional optical disc recording and/or reproducing apparatus, digitalized data information signals are applied to the optical head. A light beam according to the data emitted from the optical head is irradiated on the optical disc. As result, the data is recorded on a recording layer of the optical disc by the optical head.

However, in such a conventional optical recording and/or reproducing apparatus, a so-called track jump occurs during recording or reproducing operations when external vibrations, a shock, etc., occurs. When the track jump occurs during the recording operation, the recording data is recorded on another track which is not the desired track during the recording operation. When the track jump occurs during the reproducing operation, a sound skip occurs.

Particularly in the conventional optical disc recording and/or reproducing apparatus, if the track jump occurs during the recording operation, an irradiation position of the light beam from the optical head on the optical disc may be moved to the already recorded track. As a result, the data recorded on the optical disc is destroyed by the moved light beam. For this reason, in the conventional optical disc recording and/or reproducing apparatus, the recording and/or reproducing unit is mounted in a cabinet via a shock absorbing mechanism. The shock absorbing mechanism controls the external vibration, the shock, etc. transmitted to the recording and/or reproducing unit. However, it is difficult to interrupt the transmission of the external vibration, the shock, etc. to the recording and/or reproducing unit.

In view of this problem, the applicant has proposed an optical disc recording and/or reproducing apparatus capable of resolving a track jump, a sound skip and other defects in Japanese Patent Application No. 02-222824 which is published as Japanese Laid-Open Patent Publication No. 04 105273 (JP-A- 04105273) filed previously.

In FIG. 1, a reference numeral 1 indicates an optical disc recording and reproducing apparatus proposed previously by the applicant. A reference numeral 2 indicates a magneto-optical disc as a recording medium. The magneto-optical disc 2 is rotated by a spindle motor 1A. In this optical disc recording and reproducing apparatus 1, the magneto-optical disc 2 is irradiated by at least one light beam emitted from an optical head 3. The recording layer of the magneto-optical disc 2 is heated to the temperature of the Curie point or above by the light beam from the optical head 3. At the same time, the magneto-optical disc 2 is subjected to a modulated vertical magnetic field by a magnetic head 4 driven with recording data. As a result, the magnetized direction of the recording layer of the magneto-optical disc 2 is rotated according to the vertical magnetic field applied by the magnetic head 4 and the recording data is thermo-magnetically recorded on the magneto-optical disc 2 along tracks of the magneto-optical disc 2. The above-mentioned recording method for using the modulated magnetic field is the so-called magnetic field modulation method.

On the other hand, during reproduction, the magneto-optical disc 2 is irradiated only by the light beam from the optical head 3. The light beam emitted from the optical head 3 is scanned along the tracks of the magneto-optical disc 2. As a result, the recording data recorded on the magneto-optical disc 2 is reproduced according to a reflected light beam from the recording layer of the magneto-optical disc 2 utilizing the Kerr effect.

The optical head 3 is disposed so as to face the magnetic head 4 which generates the modulated magnetic field across the magneto-optical disc 2. The optical head 3 radiates at least one light beam from a light beam source such as, for example, a laser diode element or the like to the magneto-optical disc 2 and focuses the light beam on the recording layer of the magneto-optical disc 2 by an objective lens.

In the optical head 3, the light beam reflected by the magneto-optical disc 2 is guided to a beam splitter through the objective lens. The beam splitter separates the light beam emitted from the light beam source and the light beam reflected by the magneto-optical disc 2. The separated light beam reflected by the magneto-optical disc 2 is led to a light receiving optical system. The light receiving optical system includes an optical element such as, for example, a cylindrical lens which is used for detecting a focusing error according to a so-called astigmatism method and a photodetector which is used to detect a tracking error according to a so-called push-pull method and reproducing the recorded data. The photodetector has at least two receiving areas which are arranged in a perpendicular direction to the tracks of the magneto-optical disc 2. In the push-pull method, a tracking error signal is generated corresponding to a difference signal between the output signals from the two receiving areas of the photodetector. The optical head 3 further includes an electromagnetic actuator for moving the objective lens in a focusing direction and a tracking direction. The actuator is driven in accordance with a focusing error signal generated corresponding to the focusing error and the tracking error signal. In the recording and reproducing apparatus 1, the output signal from the optical head 3 is supplied to an RF circuit 5. The RF circuit 5 generates the focusing error signal, the tracking error signal and a reproducing signal. The RF circuit 5 supplies the focusing error signal and the tracking error signal to a servo control circuit 6 and supplies the reproducing signal to a decoder 21.

The servo control circuit 6 includes a focusing control circuit, a tracking control circuit, a spindle control circuit and a sled control circuit. The focusing control circuit drives the electromagnetic actuator of the optical head 3 so as to keep the focusing error signal on a zero level. Thereby the focusing control circuit focusing controls the light beam emitted from the optical head 3 to focus on the magneto-optical disc 2. The tracking control circuit drives the electromagnetic actuator of the optical head 3 so as to keep the tracking error signal on a zero level. Thereby the tracking control circuit controls the light beam emitted from the optical head 3 to the track of the magneto-optical disc 2 to trace the track. The spindle control circuit controls the spindle motor 1A so as to drive and rotate the magneto-optical disc 2 at a predetermined rotational speed, for example, a constant linear velocity. The sled control circuit transfers the optical head 3 and the magnetic head 4 in a radial direction of the magneto-optical disc 2 to the target track of the magneto-optical disc 2. The servo control circuit 6 outputs output data indicating an operating state of each part such as the focusing control circuit or the other control circuits to a system controller 7. The system controller 7 monitors the operating state of the servo control circuits 6 according to the output signal from the servo control circuit 6.

An abnormality detecting circuit 30 as shown in FIG. 2 includes a focus monitor circuit 31, a track jump detecting circuit 32, a discontinuity detecting circuit 33 and a gate circuit 34. The focus monitor circuit 31 is supplied with the focusing error signal from the RF circuit 5 and monitors the level of the focusing error signal. As a result, a defocused state of the optical head 3 is detected by the focus monitor circuit 31. The track jump detecting circuit 32 monitors the level of the tracking error to detect a track jump. The discontinuity detecting circuit 33 monitors a sub-Q data or a header time of a reproducing signal from the decoder 21 as later explained to detect a discontinuity of the address data of the reproducing signal. The abnormality detecting circuit 30 outputs output signals from the focus monitor circuit 31, the track jump detecting circuit 32 and the discontinuity detecting circuit 33 through the gate circuit 34 to the system controller 7. As a result the system controller 7 monitors whether the abnormalities such as track jumps and the like occur or not.

The system controller 7 is connected to an input device such as a keyboard 8 and a display unit 9. The system controller 7 controls the recording and the reproducing systems according to an operation mode assigned through the input device 8. The display unit 9 displays a reproducing time supplied from the system controller 7. The system controller 7 controls a scanning position and a reproducing position of the optical head 3 and the magnetic head 4 relative to the magneto-optical disc 2 corresponding to the address data detected from the header time, the sub-Q data and other data in sector units of the reproducing data from the magneto-optical disc 2.

On the other hand, when a bit compression mode is assigned through the input device 8, the system controller 7 switches the bit compression mode of an ADPCM encoder 13 and displays the bit compression mode data and the bit compression mode in the reproducing data on the display unit 9. The display unit 9 further displays the reproducing time according to a data compression ratio in the bit compression mode and reproducing position data of the optical head 3 to the magneto-optical disc 2 by the system controller 7. The reproducing time as a real-reproducing time is detected by multiplying the address data such as an absolute time data in the sector units detected by the header time, the sub-Q data and the other data by an inverse number (4, for example, when the compression ratio is ¼) of the data compression ratio in each bit compression mode. The system controller 7 controls the display unit 9 to display the detected reproducing time as the real reproducing time. During the recording operation, in the case where the absolute time data is recorded in a track of the magneto-optical disc, i.e., the absolute time data is preformatted in a track of the magneto-optical disc 2, the system controller 7 calculates a real recording time according to the preformatted absolute time data read out from the magneto-optical disc 2 to multiply the inverse number of the data compression ratio. The display unit 9 displays the real recording time by the system controller 7.

In the recording system of the optical recording and reproducing apparatus 1, an audio signal AIN as an analog signal is supplied to a low-pass filter (LPF) 11 through an input terminal 10. The output signal of the LPF 11 is supplied to an analog-to-digital (A/D) converter 12. The A/D converter 12 quantizes the audio signal AIN, and outputs digital audio data obtained in result to the ADPCM (Adaptive Delta PCM) encoder 13. The ADPCM encoder 13 compresses digital audio data inputted in sequence from the A/D converter 12 according to a CD-I (Compact Disc Interactive) format. The ADPCM encoder 13 is controlled by the system controller 7 to switch a processing mode of the data compression. When, for example, the data compression mode is set to a mode of B level of the CD-I format, the ADPCM encoder 13 converts the digital audio data inputted in sequence into 4-bit compressed data, having a 37.8 KHz sampling frequency, as ADPCM audio data, and outputs the compressed data to a memory 14 such as a random access memory. In the stereo mode of the B level, the ADPCM encoder 13 reduces a data transfer rate to 18.75 sectors/sec to process the of digital audio data.

In the optical disc recording and reproducing apparatus 1, the A/D converter 12 operates on a frequency 44.1 KHz as a sampling frequency of normal CD-DA format, which is a so-called Compact Disc format. As a result, in the optical recording apparatus and reproducing apparatus, after the digital audio data 44.1 KHz in frequency has its rate transformed into 37.8 KHz in frequency, 16 bits of digital audio data is compressed to 4 bits of digital audio data.

Additionally, the sampling frequency of the A/D converter 12 may be switched and controlled according to the compression mode, but in this case a frequency characteristic of the LPF 11 will be switched according to the sampling frequency of the A/D converter 12.

The memory 14 operates as a buffer memory and is controlled by the system controller 7. Thus, the memory 14 stores the ADPCM audio data outputted from the ADPCM encoder 13 temporarily and then outputs in sequence as occasion demands.

In the aforementioned B level stereo mode, the ADPCM audio data inputted to the memory 14 has its transfer rate reduced to 18.75 sectors/sec, and this compressed data is written in the memory 14 continuously. The ADPCM audio data is once interleaved, and then outputted intermittently at a predetermined timing, therefore data for one sector is recorded in the magneto-optical disc 2 for the period covering four sectors. Consequently in the optical disc recording and reproducing apparatus 1, the recording system which will be described hereinlater is employed to record the ADPCM audio data for the sector to continue accordingly.

With a cluster having a predetermined plurality of sectors, for example, 32 sectors in this case as the unit of recording data, the recording operation is carried out in a burst-like manner, which means the data stored in the memory 14 is read out in a predetermined data unit, i.e., the stored data in the memory 14 is not continuously read out from the memory 14, at the rate of 75 sectors/sec through a quiescent period. Consequently, the memory 14 stores the ADPCM audio data continuously at a low transfer rate of 18.75 (=75/4) sectors/sec according to the bit compression rate, transforms the stored ADPCM audio data into a transfer rate of 75 sectors/sec to output in the burst-like manner at a predetermined timing. Thus the memory 14 transforms a transfer rate of the ADPCM audio data from 18.75 sector/sec to 75 sectors/sec to output intermittently. When the magneto-optical disc 2 rotates at the same linear velocity as the normal CD-DA format, the ADPCM audio data is recorded at the same recording density and recording pattern as the CD-DA format.

A encoder 15 is supplied with the ADPCM audio data outputted from the memory 14 and carries out a coding process which is adds a parity code and interleaving for error correction, and then applies an EFM coding process thereto. Further, the encoder 15 outputs the encoded ADPCM audio data according to the recording format, and the magneto-optical disc 2 is recorded with the recording data in predetermined data units as cluster units which have cluster linking sectors arranged before and after each cluster as shown in FIG. 3. The cluster linking sectors are set to be longer than the length for interleaving of the encoder 15, thus the interleaving process exerts no influence on data of other clusters. The organization of the cluster unit will be later described with reference to FIG. 3.

A magnetic head driving circuit 16 drives the magnetic head 4 according to output data of the encoder 15. The magnetic head 4 generates a modulated magnetic field according to output data from the encoder 15. At this time, the system controller 7 controls an operation of the memory 14, and also controls positions of the optical head 3 and the magnetic head 4 relative to the magneto-optical disc 2. The system controller 7 then holds the optical head 3 and the magnetic head 4 at predetermined positions relative to the magneto-optical disc 2, and also controls the read timing of the memory 14. As a result, the ADPCM audio data is continuously recorded in a predetermined track of the magneto-optical disc by the optical head 3 and the magnetic head 4.

During the recording operation, when the system controller 7 receives the output signal from the abnormality detecting circuit 30, the system controller 7 immediately generates a control signal which decreases the intensity of the light beam to prevent an erroneous recording by the magnetic head 4, and further outputs an another control signal, so as to return to a normal state from the abnormal state, to the optical head 3 and the other devices of the optical disc recording and reproducing apparatus 1. Thus the system controller 7 operates to prevent an erroneous recording where there arises an abnormal state such as track jump, defocused state or the like.

Described next is the reproducing system of the optical disc recording and reproducing apparatus 1.

That is, in a reproducing mode, the decoder 21 receives binary-coded reproduced data outputted from the RF circuit 5 to carry out an EFM decoding process and an error correcting process. At this time, the system controller 7 causes the magneto-optical disc 2 to be rotated at a high speed as compared with the case where the optical disc of a normal CD-DA format is reproduced, and thus the reproduced data is processed in the decoder 21 at a transfer rate of 75 sectors/sec. The output signal from the decoder 21 is supplied to the discontinuity detecting circuit 33 and a memory 22.

The memory 22 such as a random access memory is controlled by the system controller 7 to change the operation and store output data outputted from the decoder 21 during reproduction, and outputs the temporarily stored output data in sequence at a predetermined transmission speed. During writing of the reproducing data in the memory 22 in a burst-like manner, the data is discontinuously reproduced from the magneto-optical disc 2 in predetermined data units, at a 75 sector/sec transfer rate, and the memory 22 outputs the reproducing data continuously at a 18.75 sectors/sec transfer rate. This reduces the transmission speed from that during recording and outputs the reproducing data continuously. Consequently, the system controller 7 controls the memory 22 as described hereinabove, and also controls the servo control circuit 6 so as to obtain the reproducing data at a transfer rate of 75 sectors/sec. At this time the system controller 7 controls positions of the optical head 3 and the magnetic head 4 so that the reproducing data is output continuously when written in the memory 22 in the burst-like manner.

An ADPCM decoder 23 carries out a process counter to the ADPCM encoder 13 correspondingly to the ADPCM encoder 13 of the recording system. The ADPCM decoder 23 processes the reproducing data outputted from the memory 22 in sequence in the operation mode set by the system controller 7, and expands the ADPCM audio data four times to convert the outputted data into digital audio data.

A digital-to-analog (D/A) converter 24 is supplied with the digital audio data outputted from the ADPCM decoder 23 and transforms the digital audio data into an analog signal to generate an audio signal AOUT, and outputs the audio signal AOUT through a low-pass filter (LPF) 25 and an output terminal 26.

The reproducing system of the optical disc recording and reproducing apparatus 1 is then provided with a digital output function, and has a digital output circuit 27 and an digital output terminal 28. The output data as a digital audio signal of the ADPCM decoder 23 is outputted through the digital output circuit 27 and the digital output terminal 28.

A recording/reproducing operation of the optical disc recording and reproducing apparatus constructed as above is as follows:

As shown in FIG. 3, data read out from the memory 14 as recording data is converted to a plurality of predetermined data blocks, at each block having a plural number of sectors, for example, 32 sectors B0 to B31. The predetermined data block is called a cluster and cluster linking sectors are arranged between these clusters. The sectors for linking the clusters are allocated in 5 pieces each as linking sectors L1 to L5 before and after a cluster Cn. In the optical disc recording and reproducing apparatus 1, for recording data with reference, for example, to a k-th cluster Ck, the data is recorded in 38 sectors all told including the linking sectors, three each before and after the cluster, that is, the three sectors L3 to L5 on the side of a cluster Ck−1 (hereinafter called run-in blocks) and the three sectors L1 to L3 on the side of a cluster Ck+1 (hereinafter called run-out blocks).

The encoder 15 applies an interleaving process to the recording data for these 38 sectors, and when the data is recorded in 38 sectors in this case, there may be a case where an influence is exerted on the recording data of the clusters coming before and after thereof. However, the encoder 15 rearranges the recording data in a distance of 108 frames maximum (corresponding to about 1.1 sectors) for interleaving. Meanwhile, in the optical disc recording and reproducing apparatus 1, a distance long enough to cover the distance for rearrangement may be secured before and after the cluster by disposing the run-in blocks L3 to L5 and the run-out blocks L1 to L3 before and after the cluster, and hence when recording the data in 38 sectors, no influence will be exerted on the recording data assigned to the clusters coming before and after thereof.

Then, dummy data having a 0 value, for example, is assigned to the linking sectors L1 to L5, thereby avoiding an evil influence on the original data through interleaving.

Similarly, when recording the next cluster Ck+1, the optical disc recording and reproducing apparatus 1 records the data in 38 sectors, however, the data may be recorded in this case in 37 sectors barring one sector L3 of the run-in blocks or the run-out blocks.

As a result, from providing the run-in blocks and the run-out blocks long enough to cover the maximum distance rearranged through interleaving and recording data in clusters, an interference with other clusters at the time of interleaving can be prevented, thereby processing the reproducing data easily. Further, when the recording data cannot be recorded normally at the time of recording due to defocusing, tracking error or other erroneous operations, the data can easily be re-recorded by recording and reproducing it intermittently in 38 sectors, and the reproducing operation can be repeated in clusters at the time of reproducing. Accordingly in the optical disc recording and reproducing apparatus 1, a sound skip and others at the time of track jump can be avoided by repeating the recording or reproducing operation easily.

The system controller 7 hence carries out a procedure shown in FIG. 4 to control the entire operation during the recording operation. That is, in a recording mode, the system controller 7 shifts from step SP1 to step SP2, where whether or not recording data for one cluster is stored in the memory 14 is decided, and if a negative result is obtained, step SP2 is repeated.

If the recording data for one cluster is stored in the memory 14, then an affirmative result is obtained in step SP2, therefore the system controller 7 shifts to step SP3, and drives the optical head 3 and the magnetic head 4 to start recording of the recording data.

The system controller 7 then shifts to step SP4, where a recording operation for one cluster is monitored, and whether or not the recording data has been recorded completely is decided.

When an affirmative result is obtained here, the system controller 7 shifts to step SP5 to set the power of the light beam to a reproducing level, and then shifts to step SP6, where whether or not the recording data has all been recorded thoroughly is decided.

If a negative result is obtained, then the system controller 7 returns to step SP2.

Thus the system controller 7 repeats the processing loop coming in steps SP2—SP3—SP4—SP5—SP6—SP2, repeats the recording operation as securing a space area K not less than a predetermined quantity at all times in the memory 14, and when the recording is completed entirely for the recording data, it shifts to step SP7 to close the procedure.

If a negative result is obtained in step SP4 in this case, the system controller 7 shifts to step SP8, and decides whether or not an abnormality is detected by the abnormality detecting circuit 30.

If a negative result is obtained here, the system controller 7 returns to step SP4, and while the data for one cluster is recorded, an abnormality detecting operation of the abnormality detecting circuit 30 is monitored.

When an abnormality is detected by the abnormality detecting circuit 30 in such state, the system controller 7 shifts to step SP9 to switch the intensity of light beam immediately to the reproducing level, thereby keeping the recorded data from being erased erroneously.

The system controller 7 then shifts to step SP10 to output a control signal to the servo control circuit 6, thereby returning the recording system from an abnormal state.

The system controller 7 further shifts to step SP11 to set again the recording data for the cluster on which an abnormality has been detected, and then shifts to step SP3 to commence a re-recording of the recording data.

As a result, it operates for recording in clusters, and when an abnormality is detected by the abnormality detecting circuit 30 during the recording operation, the recording operation is recommenced for the cluster on which the abnormality has been detected, thereby securing a continuity of the recording data.

Further, from recording the recording data stored in the memory 14 by repeating the processing loop coming in steps SP2—SP3—SP4—SP5—SP6—SP2 consecutively, a quantity of the recording data stored in the memory 14 during a return operation will be reduced, and thus the space area K of the memory 14 can be secured.

Meanwhile, as shown in FIG. 5, in the optical disc recording and reproducing apparatus 1, one sector (block) is formed of 2352-byte data, of which the first 12 bytes are assigned to synchronizing data, the following 4 bytes are assigned to header data, and the remaining 2336 bytes are assigned to the ADPCM audio data and others. As shown in FIG. 6, if each sector (block) is expressed in a two-dimensional array, the synchronizing 12 bytes have the first 1 byte set to 00H (H indicating a hexadecimal number), the following 10 bytes set to FFH, and the remaining 1 byte set to 00H. Further, the ensuing 4-byte header has data of MINUTE, SECOND and BLOCK assigned 1 byte each, the MINUTE, SECOND and BLOCK forming an address part, and then 1-byte data for mode data is assigned. The mode data is that for indicating chiefly a CD-ROM format, and the sector structure shown here is that of corresponding to MODE 2 of the CD-ROM format. In this connection the CD-I format is a standard using MODE 2 of the CD-ROM format, and a content of 12-byte data (D0001 to D0008) following to the aforementioned header is specified as shown in FIG. 7. As shown in FIG. 8, a synchronization byte and a header byte of FORM 1 and FORM 2 of the CD-I format are identical with MODE 2 of the CD-ROM format shown in FIGS. 3, 5 and 6, and an ensuing sub-header has the standard of the CD-ROM format shown in FIG. 3 applied thereto. The sub-header has data D0001, D0005 assigned to the file number, data D0002, D0006 assigned to the channel number, data D0003, D0007 assigned to the sub-mode information, and data D0004, D0008 assigned to the data type information, and the identical content is written double for the data D0001 to D0004, D0005 to D0008 each. For the following 2328 bytes, while 2048 bytes are assigned for user data, 4 bytes are assigned for error detection, 172 bytes are assigned for P parity, and 104 bytes are assigned for 0 parity in FORM 1 of the CD-I format, 2324 bytes are assigned for user data, and the remaining 4 bytes are assigned to reserve data in FORM 2 of the CD-I format. Thus, while FORM 1 of the CD-I format is intended for recording character information, binary data, high-compressed video data and others, FORM 2 of the CD-I format is applied for recording high-compressed audio data and video data. In case the compressed audio data is recorded, in FORM 2 of the CD-I format, 2324 bytes of the user data are divided to form 18 sound groups (2304 bytes all told) each having 128 bytes, and the remaining 20 bytes are assigned to the space area.

In the optical disc recording and reproducing apparatus 1, the data of such a sector structure is subjected to coding by the encoder 15, and thus audio data is recorded in the recording format shown in FIG. 9. In the optical disc recording and reproducing apparatus 1, 1 block (1 sector) is divided into 98 frames coming in the 1st frame to the 98th frame to recording on the magneto-optical disc. Each frame is allocated a term 558 times (558 T) a channel clock cycle T and is formed of 27 T (3 T being a connecting bit) of a frame synchronous pattern portion, 17 T (3 T being a connecting bit) of a sub-code portion, and 544 T of a data (audio data and parity data) portion. The 544 T data portion of each frame has two portions of 12 bytes (12 symbols) of audio data and 4 bytes of parity data formed through EFM modulation, and hence 24 bytes of audio data.

As shown in FIG. 10, on the other hand, the 14 T sub-code portion has 8 bits of sample code data formed through EFM modulation, data of the sub-code channel being allocated to each bit. The sub-code channel data is blocked in 98 frames to recording, thereby forming 8 sub-code channels P to W for the 98 frames. However, the sub-code portions of the first and second frames have EFM out-of-rule block synchronous patterns S0, S1 allocated, and the practical sub-code channels P to W are allocated to 96 bits from the third frame to the 98th frame.

Meanwhile, as shown in FIG. 11, in the optical disc recording and reproducing apparatus 1, data similar to the CD-DA format, that is, audio data (expressed by CD-DA data) 44.1 KHz in sampling frequency, 16 bits in quantizing bit number and 75 sectors/sec in data transfer rate is outputted from the A/D converter 12, and after the sampling frequency is transformed into 37.8 KHz by the ADPCM encoder 13, the quantizing bit is compressed to 4 bits. Thus in the optical disc recording and reproducing apparatus 1, the data transfer rate is reduced to ¼, and the ADPCM audio data which is transferred at 18.75 sectors/sec is generated. When inputting or outputting the ADPCM audio data to or from the memory 14, the system controller 7 increments, as shown in FIG. 12, a write pointer W (a read pointer being indicated by symbol R in correspondence to the write pointer) of the memory 14 continuously at a rate corresponding to the data transfer rate of 18.75 sectors/sec. As a result, the ADPCM audio data is continuously stored in the memory 14 at the transfer rate of 18.75 sector/sec. Further the system controller 7 monitors a quantity of the ADPCM audio data stored in the memory 14, and when the data quantity reaches a predetermined quantity K or over, the read pointer R of the memory 14 is incremented at the burst-like manner at a rate corresponding to the data transfer rate of 75 sectors/sec by the system controller 7. Thus in the optical disc recording and reproducing apparatus 1, the ADPCM audio data is outputted as recording data in the burst-like manner in the unit of the predetermined quantity K at the transfer rate 75 sectors/sec. The aforementioned predetermined quantity K is defined with the data quantity for one cluster as a unit.

In the recording system of the optical disc recording and reproducing apparatus 1, the ADPCM audio data outputted continuously at a transfer rate of 18.75 sectors/sec is stored in the memory 14, and the ADPCM audio data within the memory 14 is read out in the predetermined quantity K in the burst-like manner at the transfer rate of 75 sectors/sec. As a result, when the ADPCM audio data is processed, a space area which is not stored with the data yet is always secured for a predetermined quantity or more within the memory 14. Further, in recording system of the optical disc recording and reproducing apparatus, the recording data is recorded continuously on the track of the magneto-optical disc 2 to control the recording position on the magneto-optical disc 2, however, the recording data is read out from the memory 14 in the burst-like manner. At this time, in the optical disc recording and reproducing apparatus 1, a space area of a predetermined quantity or over is secured at all times in the memory 14, and hence even in case a recording operation is interrupted for a track jump, the ADPCM audio data can be stored in the memory 14 by using the space area, and also the recording data can be recorded continuously on the track of the magneto-optical disc 2 after operation for the return process. The optical disc recording and reproducing apparatus 1 then generates header time data corresponding to a physical address of the sector, and adds the header time data at every sector of the ADPCM audio data to record on the magneto-optical disc 2.

In the optical disc recording and reproducing apparatus 1, the position data of the recording area recorded with the ADPCM audio data and the content data indicating the recording mode are recorded in a content area of the magneto-optical disc 2.

Next, as shown in FIG. 13, in the reproducing system of the optical disc recording and reproducing apparatus 1, a write pointer W of the memory 22 is incremented at a rate corresponding to the data transfer rate of 75 sectors/sec by the system controller 7, and thus reproducing data is written in the memory 22 at the transfer rate of 75 sectors/sec. Further, in the reproducing system of the optical disc recording and reproducing apparatus 1, a read pointer R of the memory 22 is incremented continuously at a rate corresponding to the data transfer rate of 18.75 sectors/sec, and thus reproducing data is outputted continuously from the memory 22 at the transfer rate of 18.75 sectors/sec. At this time, the system controller 7 stops to write when the write pointer W catches up with the read pointer R, but recommences writing when the reproducing data in the memory 22 drops down to a predetermined quantity or below.

Thus in the reproducing system of the optical disc recording and reproducing apparatus 1, when the transfer rate is reduced through the memory 22 to store the reproducing data, the reproducing data is outputted continuously by holding the reproducing data coming at a predetermined quantity L or over in the memory 22 at all times. Further, in the reproducing system of the optical disc recording and reproducing apparatus 1, the reproducing data is outputted continuously from the memory 22 to control the reproducing position on the magneto-optical disc 2, however, the reproducing data is reproduced from the magneto-optical disc 2 at the burst-like manner.

Thus in the reproducing system of the optical disc recording and reproducing apparatus 1, the reproducing data coming at the predetermined quantity L or over is secured in the memory 22, which is ready for reading out the reproducing data stored in the memory 22 and outputting an analog audio signal continuously even in case a track jump occurs.

Meanwhile, in the optical disc recording and reproducing apparatus 1, the ADPCM audio data is thus recorded through the memory 14 in which a space area is secured for a predetermined quantity, therefore even in case a track jump occurs, recording data can be recorded continuously on a track of the magneto-optical disc 2.

However, in the optical disc recording and reproducing apparatus 1, the ADPCM audio data is inputted to the memory 14 even when an abnormal state is detected during re-recording, therefore if a track jump arises, then the available space area of the memory 14 will be reduced. Thus in the optical disc recording and reproducing apparatus 1, when a track jump occurs too frequently, the space area of the memory 14 cannot be secured after all. As a result, in the memory 14, the ADPCM audio data inputted in sequence will be recorded in a recording area of the ADPCM audio data not yet recorded. A problem inherent in the optical disc recording and reproducing apparatus 1 is therefore that when the track jumps occur too often, there may be recording of discontinuous recording data on the magneto-optical disc 2.

SUMMARY OF THE INVENTION

It is, therefore, an object of the invention to provide an optical disc recording apparatus which resolves the above mentioned problems.

It is another object of the invention to provide an optical disc recording apparatus capable of preventing a discontinuous recording of data even in case a track jump occurs frequently.

According to a first embodiment of the present of the invention, there is provided an optical disc recording apparatus including a memory, a recording device, a detector and a controller. The memory stores input data in sequence at a first transmission rate and reads out the stored input data at a second transmission rate which is faster than the first transmission rate and outputs the data read at the second transmission rate as recording data in predetermined data units. The recording device adds a cluster connecting sector with a data length long enough to cover a distance to rearrange data through interleaving before and after the recording data in the predetermined data unit and or recording the interleaved data on an optical disc. The detector detects an abnormality of the recording operation of the recording device and outputs an output signal as an abnormality detected result. The controller controls the recording device to stop re-recording and display an error message if too many abnormality detected results occur in too short a period of time to be accommodated by the memory.

According to a second embodiment of the present of the invention, there is provided an optical disc recording apparatus including a memory, a recording device, a first detector, a second detector and a controller. The memory stores input data in sequence at a first transmission rate, and reads out the stored input data at a second transmission rate which is faster than the first transmission rate and outputs the data read at the second transmission rate as recording data in predetermined data units. The recording device adds a cluster connecting sector with a data length long enough to cover a distance to rearrange data through interleaving before and after the recording data in the predetermined data unit and records the interleaved data on an optical disc. The first detector detects an abnormality of the recording operation of the recording device and outputs an output signal as an abnormality detected result. The second detector monitors the capacity of the memory to store the input data and outputs an output signal as a monitored result. The controller controls the recording device corresponding to the output signal from the first detector and the output signal from the second detector.

In the above-described invention, an abnormality during recording operation is detected, and the recording device is controlled according to the abnormality detection result obtained within a predetermined period. As a result, a re-recording of recording data can be stopped at the point in time when an available space area, which is the capacity for storing recording data, of the memory cannot be secured. Further, an available space area of the memory is monitored, and from the controlling operation of the recording device according to a monitored result, a re-recording of the recording data can be stopped at the point in time when the space area of the memory cannot be secured.

BRIEF DESCRIPTION OF THE DRAWINGS

The invention will be more readily understood with reference to the accompanying drawings, wherein:

FIG. 6 shows a schematic diagram of a sector structure.

FIG. 7 shows a schematic diagram serving for a description of a CD-ROM format.

DESCRIPTION OF THE INVENTION

Figure 1:
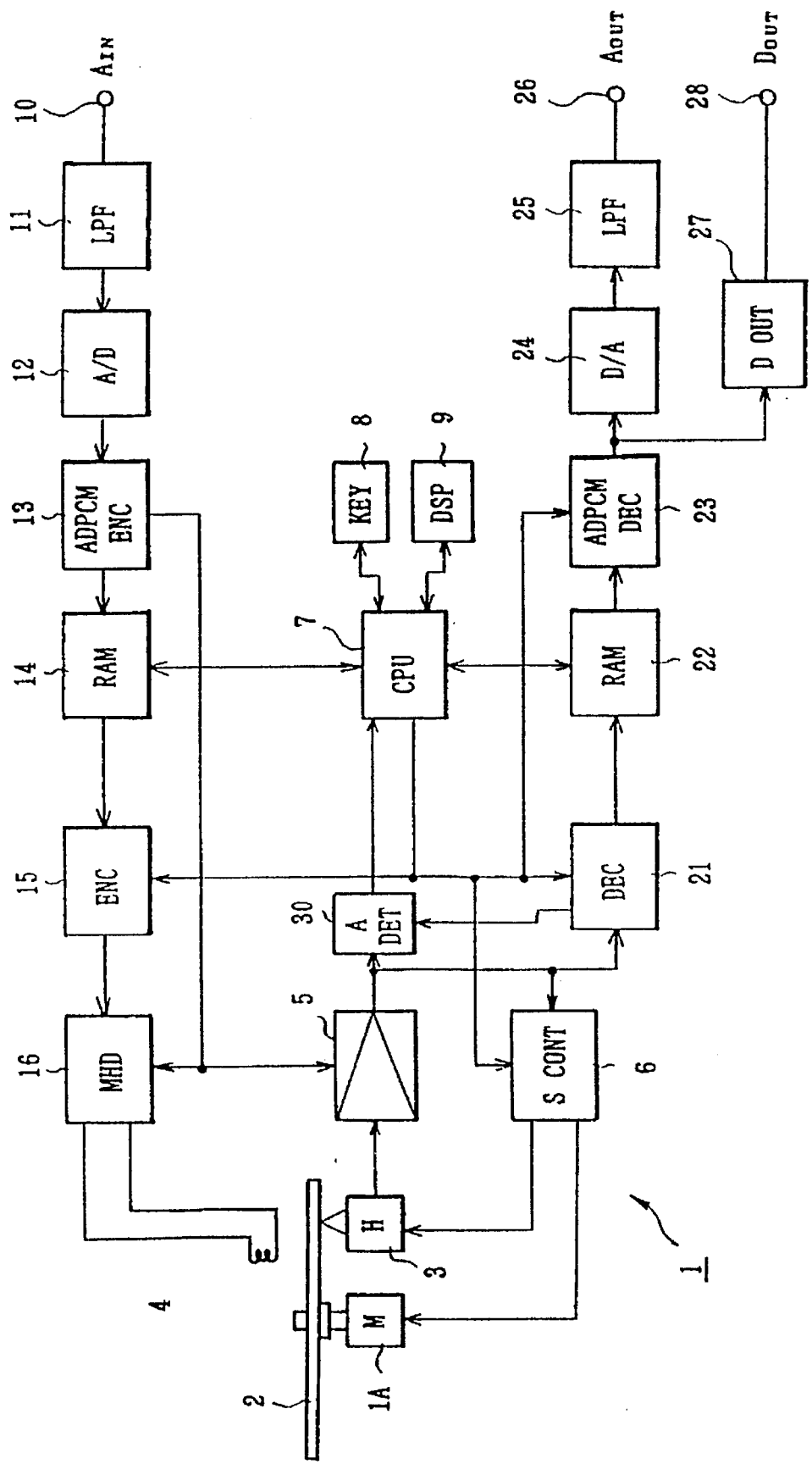
FIG. 1 shows a block diagram of a background art optical disc recording and reproducing apparatus.
Figure 2:
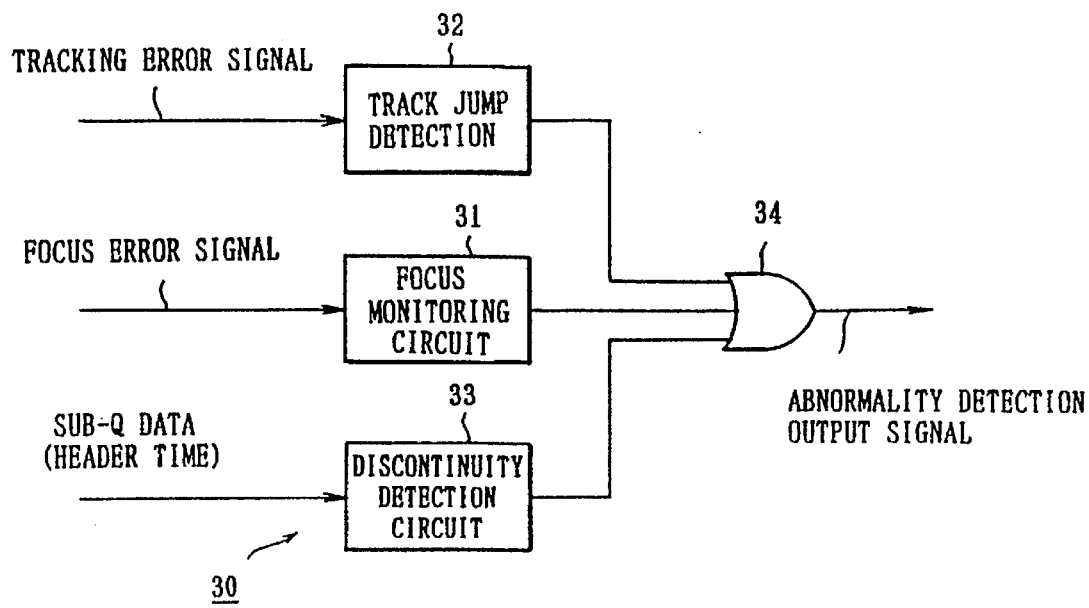
FIG. 2 shows a block diagram of a conventional abnormality detecting circuit.
Figure 5:
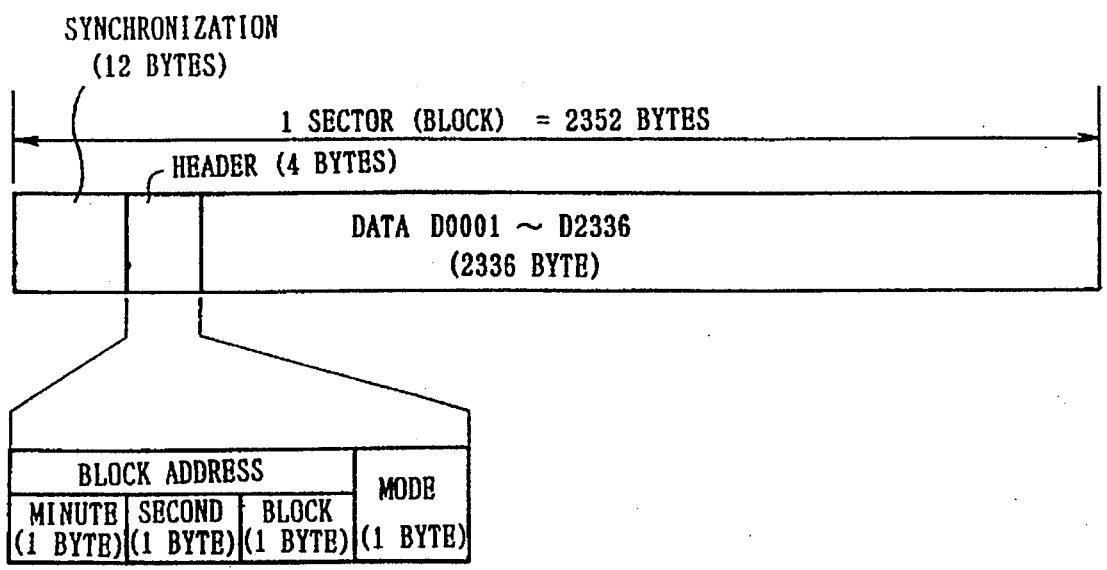
FIG. 5 shows a schematic diagram serving for a description of sector data.
Figure 3:
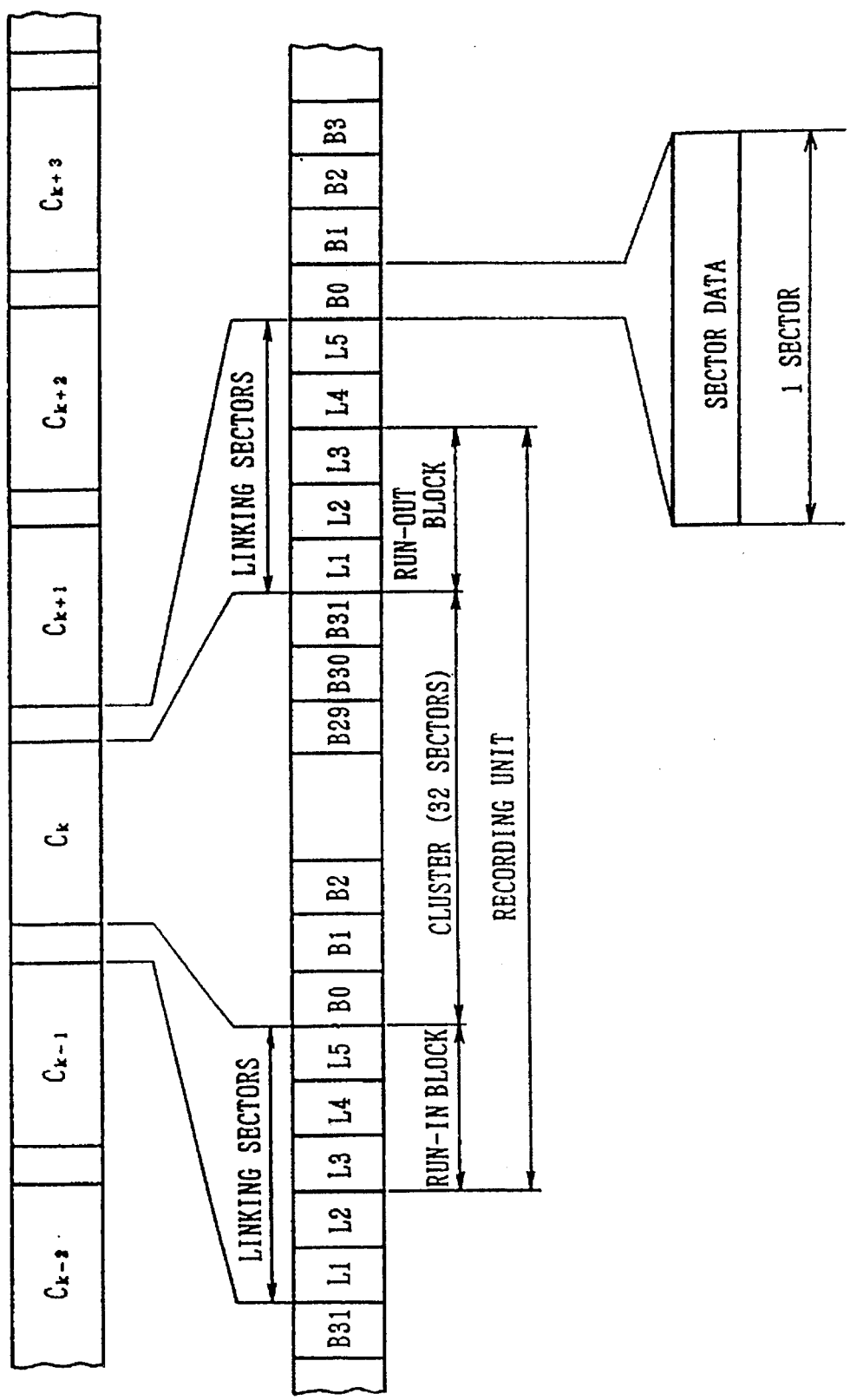
FIG. 3 shows a schematic diagram serving for a description of a recording format.
Figure 4:
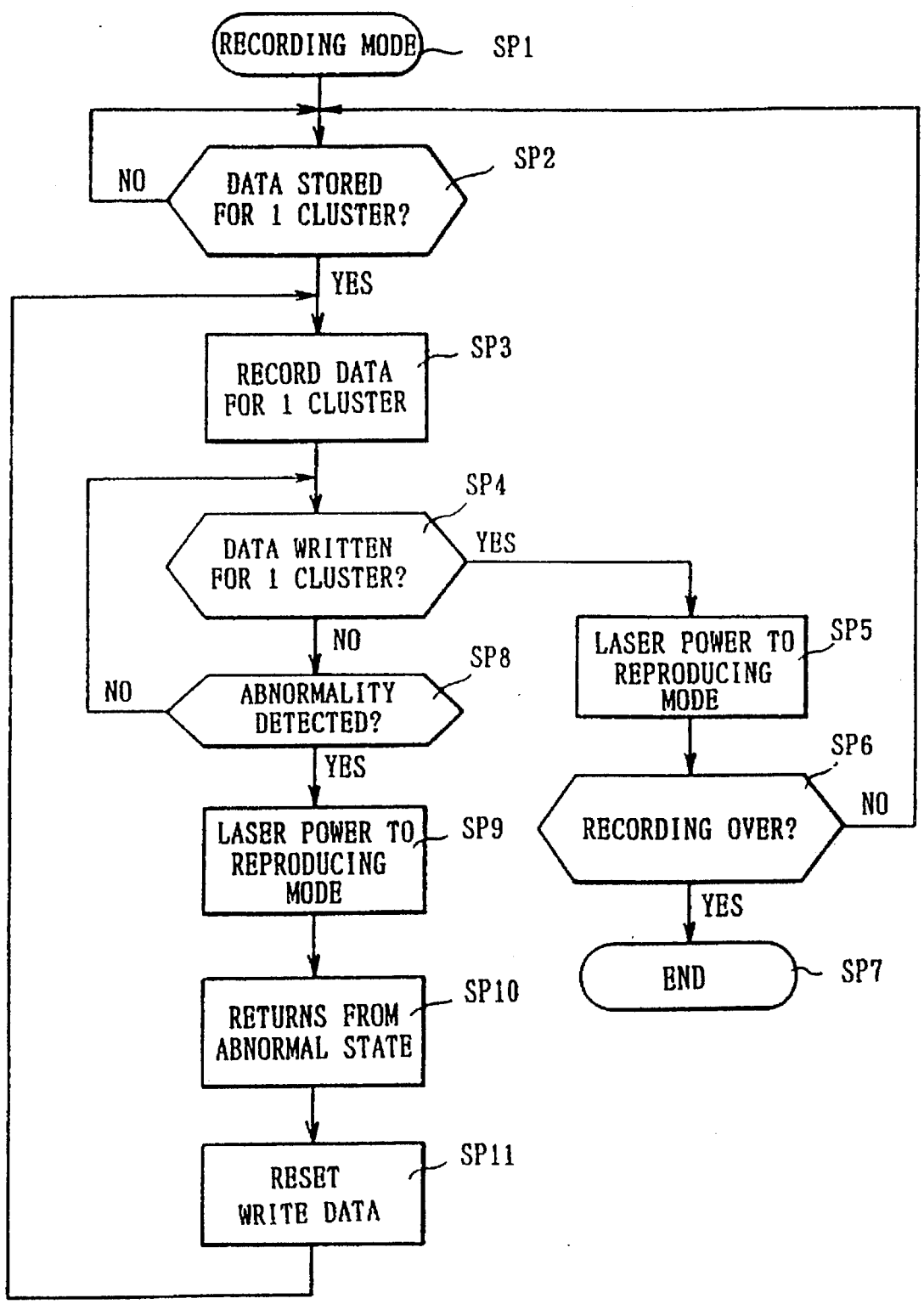
FIG. 4 shows a flow chart serving for a description of a recording operation.
Figure 8:
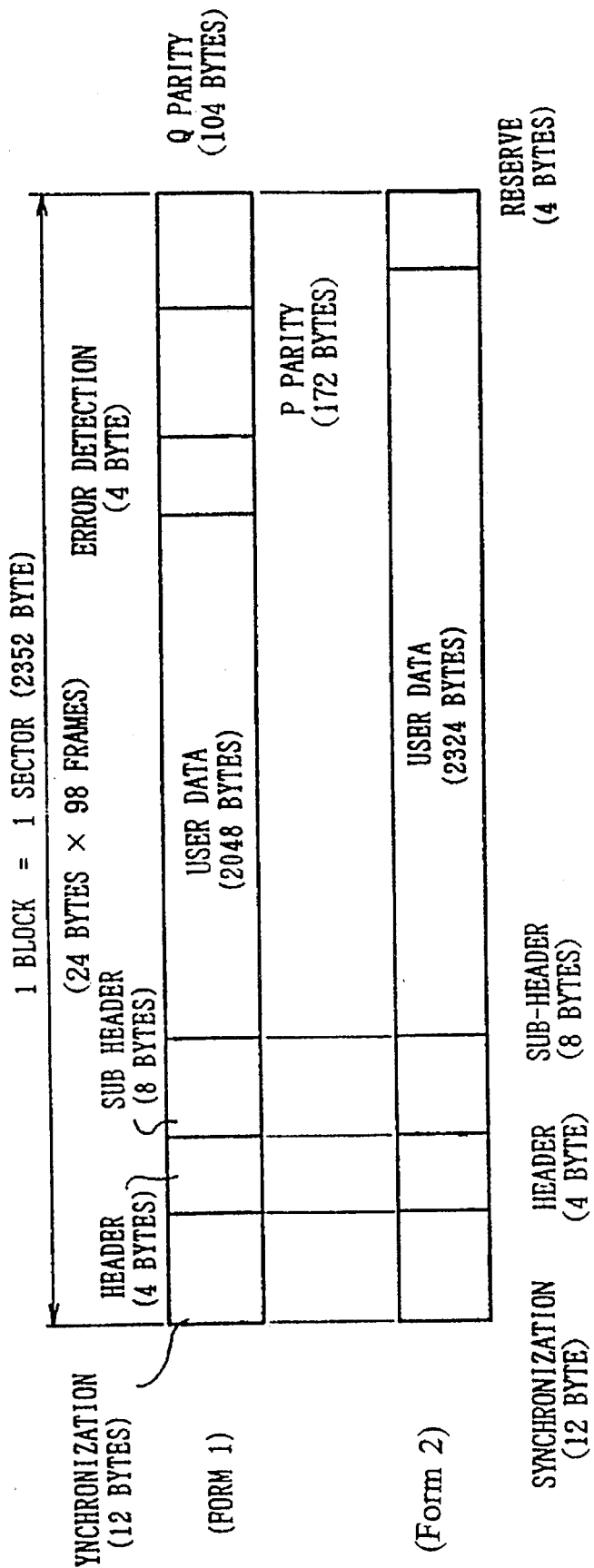
FIG. 8 shows a schematic diagram of a data structure of a CD-I format.
Figure 9:
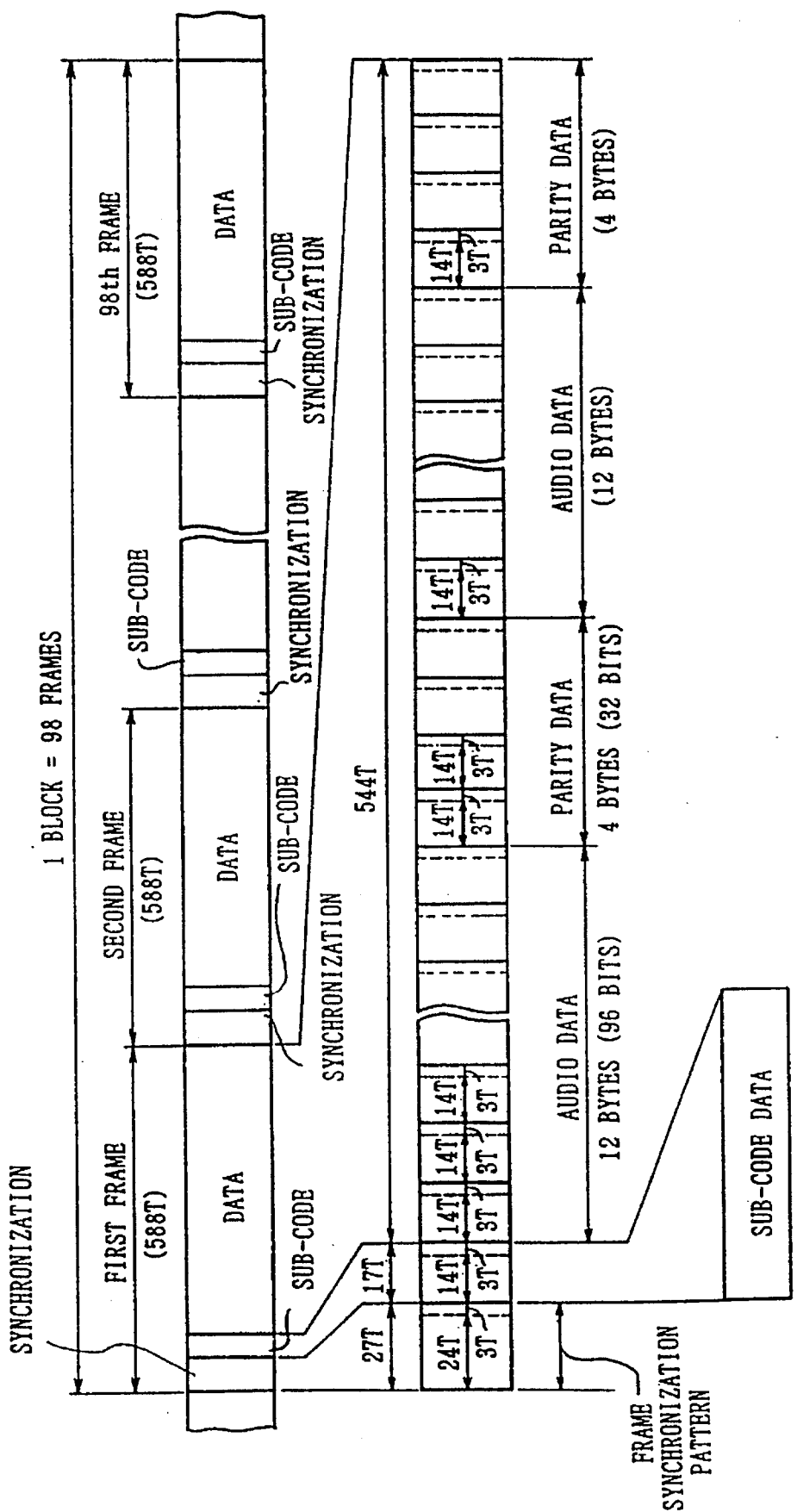
FIG. 9 shows a schematic diagram serving for a description of a frame and a block format.
Figure 10:
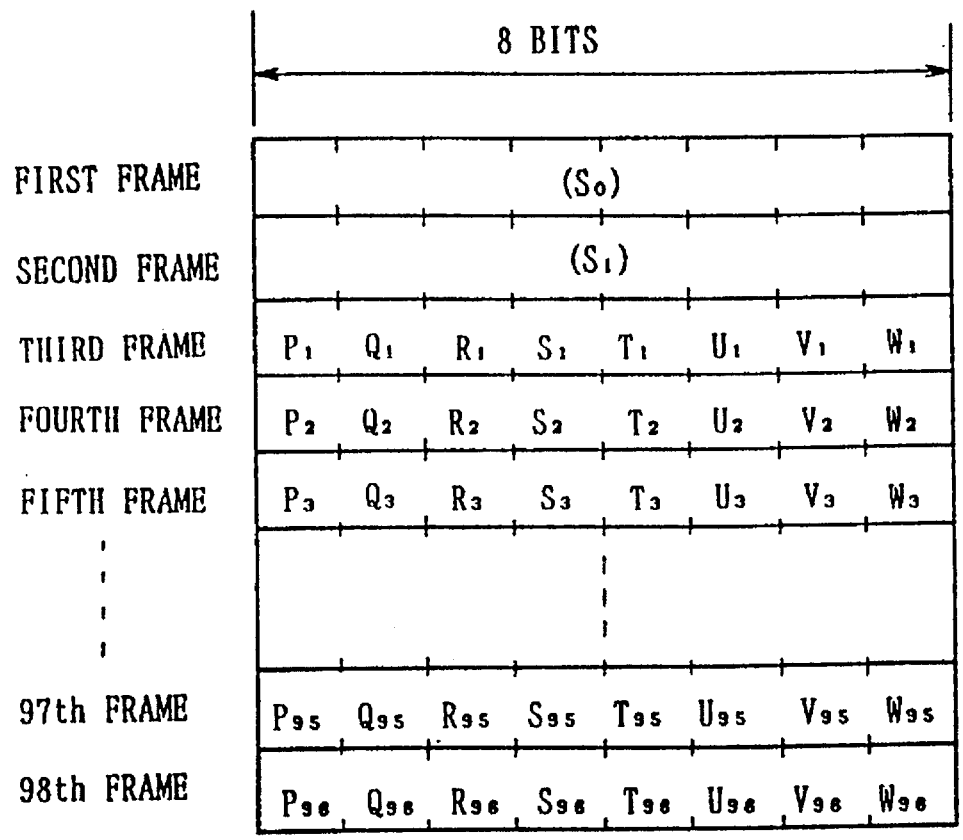
FIG. 10 shows a schematic diagram serving for a description of sub-code data.
Figure 11:
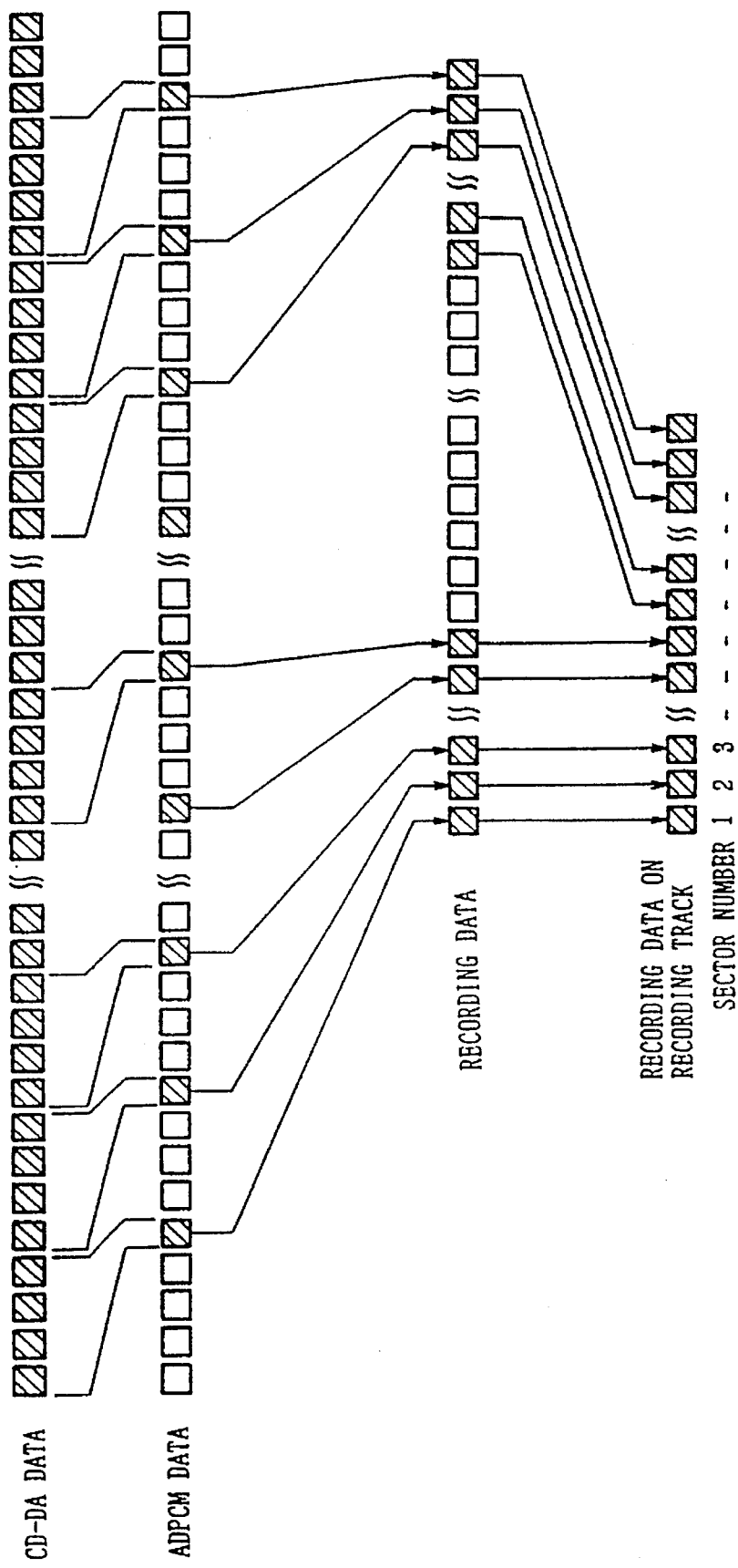
FIG. 11 shows a schematic diagram serving for a description of audio processing.
Figure 14:
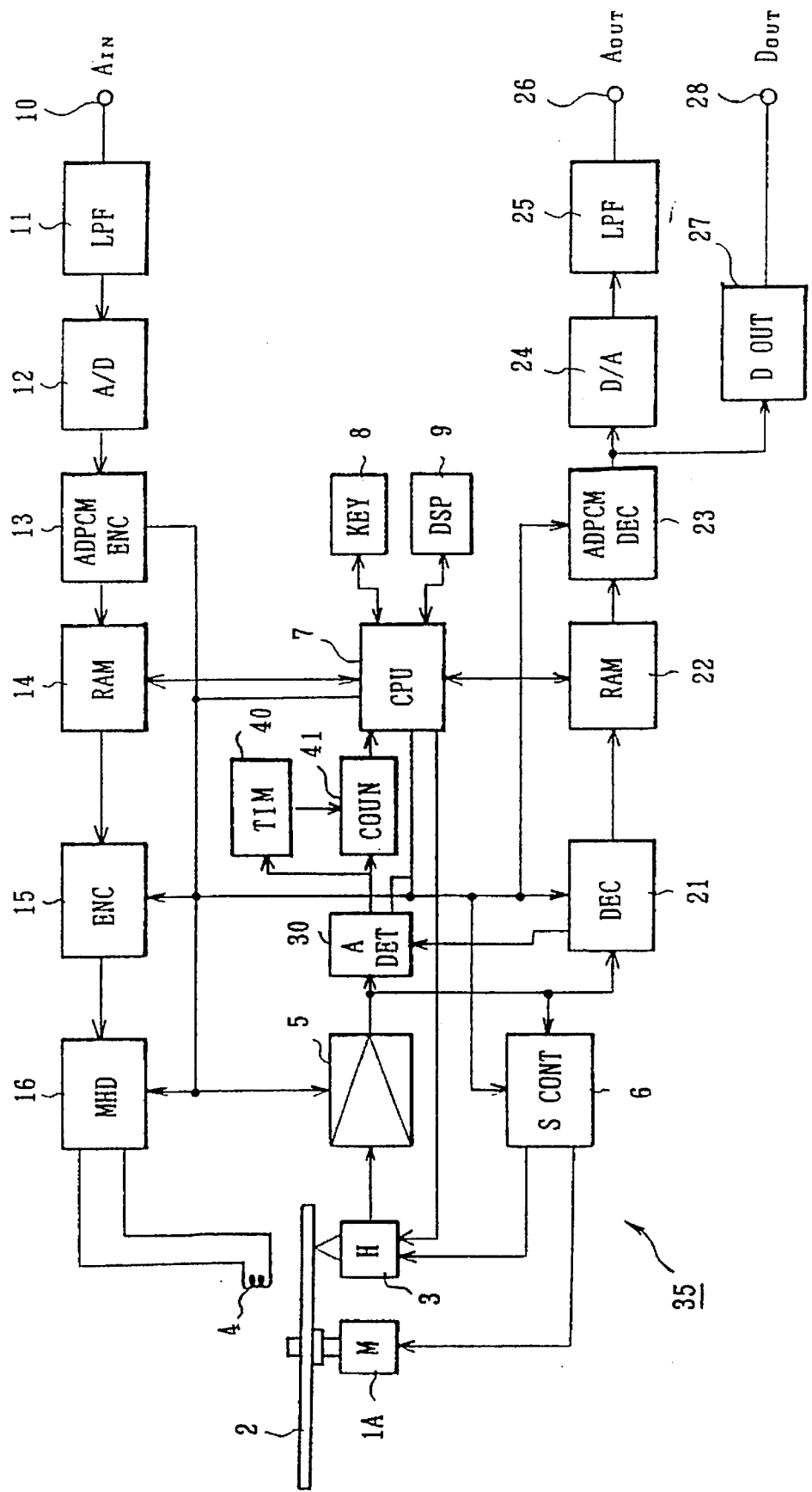
FIG. 14 shows a block diagram of a first embodiment of the present invention.

A first embodiment of the invention will be described in detail with reference to FIG. 14. In FIG. 14, like elements corresponding to those in FIG. 1 are identified by the same reference numerals and will not be described. In FIG. 14, a reference numeral 35 indicates an optical disc recording and reproducing apparatus as a whole. In the first embodiment, the output signal as the abnormality detection result from the abnormality detecting circuit 30 is supplied to a timer 40 and a counter 41. The system controller 7 is supplied with an output signal from the counter 41.

The timer 40 includes a reference clock generating circuit and a counter circuit (not shown). A reference clock generated by the reference clock generating circuit is counted by the counter circuit. The timer 40 outputs a control signal to the counter 41 when a predetermined period, for example, 3 seconds have passed after a first abnormality detection result from the abnormality detecting circuit 30 is supplied to the timer 40. The counter 41 is stopped from counting the abnormality detection signal by the control signal from the timer 40. The counter circuit of the timer 40 starts counting the reference clock with the receipt of the first abnormality detection result from the abnormality detecting circuit 30.

At the same time that the timer 40 starts counting the reference clock, the counter 41 sets a count value to 1 according to the abnormality detection result from the abnormality detecting circuit 30 and then counts the ensuing abnormality detection results. The counter 41 outputs an output signal as the counting result to the system controller 7 when the count value reaches a predetermined value, for example, "3" in the predetermined period determined by the timer 40.

A recording and a reproducing system of the optical recording and reproducing apparatus 35 are controlled by the system controller 7 as in the case of the optical recording and reproducing apparatus shown in FIG. 1. In the optical recording and reproducing apparatus 35, when the abnormality detection result is obtained from the abnormality detecting circuit 30, the recording operation is interrupted and then the recording data is re-recorded on the magneto-optical disc 2 in the recording mode, and the reproducing operation is repeated in the reproducing mode. Accordingly, in the optical disc recording and reproducing apparatus 35, the recording data can be recorded continuously on the magneto-optical disc 2 and the reproducing data can be outputted continuously via the memory 22 when a track jump occurs. In the recording mode, when a count value of "3" as the predetermined value is outputted from the counter 41 to the system controller 7, the system controller 7 stops the recording operation and controls the display unit 9 to display an error message.

In the embodiment, the memory 14 is capable of storing an amount of recording ADPCM audio data corresponding to 3 seconds of the audio signal AIN. In the optical disc recording and reproducing apparatus 35, after an abnormality is detected by the abnormality detecting circuit 30, a period of time, for example, a maximum of 1 second will be required for transferring the optical head and the magnetic head 4 to complete a re-recording operation. Accordingly, in the optical disc recording and reproducing apparatus 35, a space area, representing the capacity for storing new recording data, of the memory 14 can be secured in case the abnormality detection result is obtained three times until the re-recording operation is completed after an abnormality was detected by the abnormality detecting circuit 30. However, if the abnormality detection result is obtained four times or more during the predetermined period, for example 3 seconds in this case, the available space area of the memory 14 is no longer present, and the recording data will be updated by the memory 14 before the re-recording operation is completed. That is, when the count value of the counter 41 comes to "3" the available space area of the memory 14 becomes incapable of storing the recording data to complete the re-recording operation at one time. As a result, the recording data can not be recorded continuously on the magneto-optical disc 2. Accordingly, in the optical recording and reproducing apparatus 35, when the count value of the counter 41 becomes "3" the recording operation is stopped and the error message is displayed on the display unit 9, thereby preventing the recording data from being discontinuously recorded on the magneto-optical disc 2.

Figure 12:
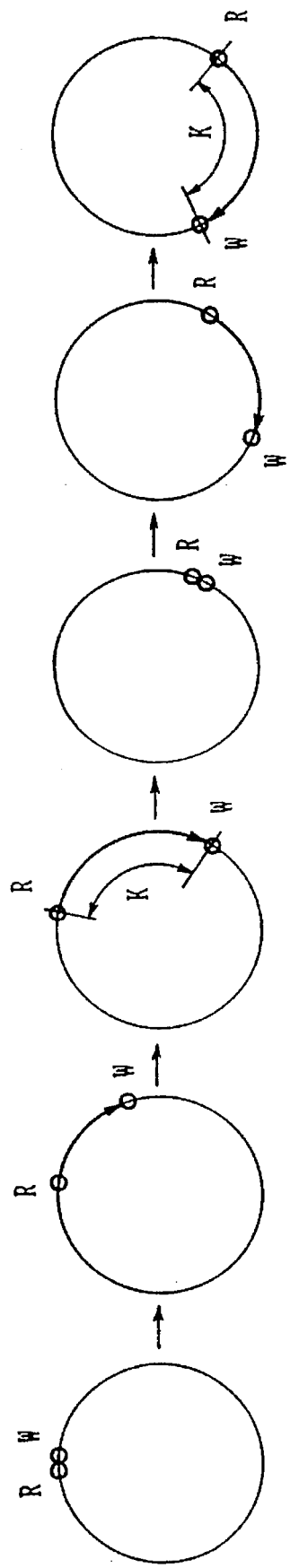
FIG. 12 shows a schematic diagram serving for a description of memory control in a recording system.
Figure 13:
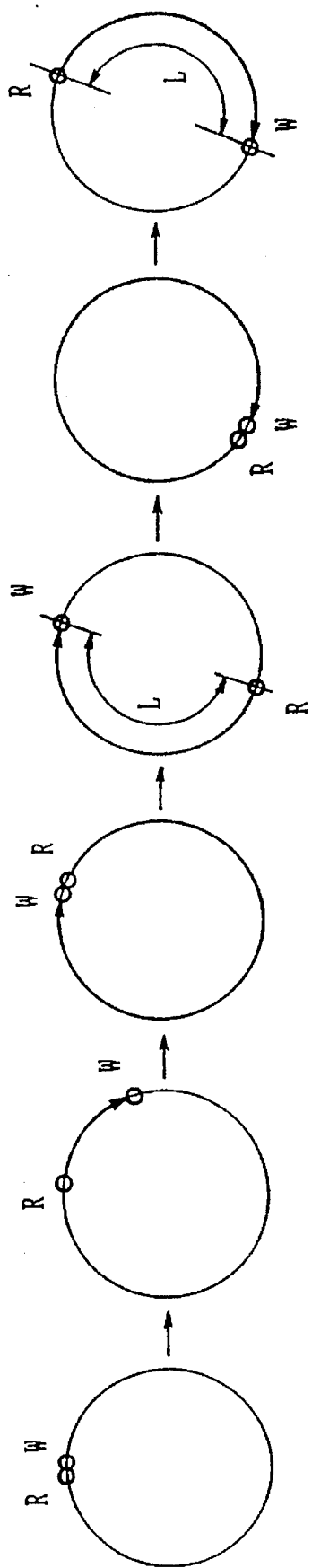
FIG. 13 shows a schematic diagram serving for a description of memory control in a conventional reproducing system.
Figure 15:
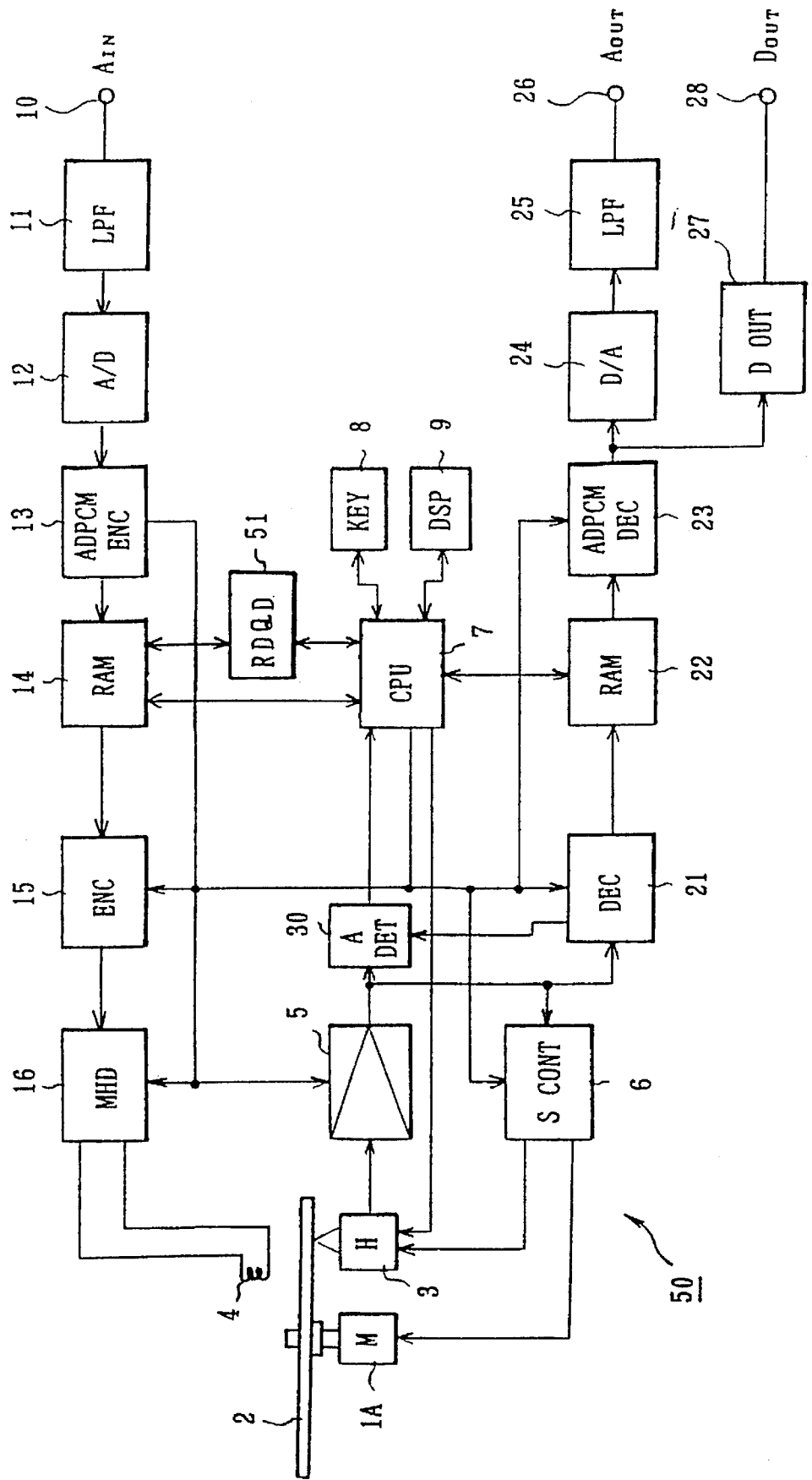
FIG. 15 shows a block diagram of a second embodiment of the present invention.

Next, a second embodiment of the invention will be described in detail with reference to FIG. 15. In FIG. 15, like elements corresponding to those in FIG. 1 are identified by the same reference numerals and will not be described. In FIG. 15, a reference numeral 50 indicates an optical disc recording and reproducing apparatus as a whole. The optical disc recording and reproducing apparatus 50 includes a remaining data quantity detection circuit 51. The detection circuit 51 detects the capacity of the space area, i.e., the capacity for storing new recording data, of the memory 14. The detection circuit 51 monitors the space area of the memory 14 to calculate the space between a write pointer W and a read pointer R of the memory 14 shown in FIGS. 12 and 13. If the read pointer R is an up stream address with respect to the write pointer W, the space area of the memory 14 is the capacity which has a start address decided by the read pointer R and an end address decided the write pointer W. In other words, the space area of the memory in this case is defined as the capacity between the read pointer R and the write pointer W. If the write pointer W is an up stream address with respect to the read pointer R, the space area of the memory 14 is defined by subtracting the capacity between the write pointer W and the read pointer R from the whole capacity of the memory 14. In this case, in other words, the space area of the memory 14 is defined by adding the capacity from the start address of the memory 14 to the write pointer W and the capacity from the read pointer R to the end address of the memory 14.

A recording and a reproducing system of the optical recording and reproducing apparatus 50 are controlled by the system controller 7 of the optical recording and reproducing apparatus shown in FIG. 1. In the optical recording and reproducing apparatus 50, when an abnormality detection result is obtained from the abnormality detecting circuit 30, the recording operation is interrupted and then the recording data is re-recorded on the magneto-optical disc 2 in the recording mode, and the reproducing operation is repeated in the reproducing mode. Accordingly, in the optical disc recording and reproducing apparatus 50, the recording data can be recorded continuously on the magneto-optical disc 2 and the reproducing data can be outputted continuously via the memory 22 when a track jump occurs.

In the embodiment of FIG. 15, the memory 14 is capable of storing the recording ADPCM audio data corresponding to 3 seconds of the audio signal AIN. In the optical disc recording and reproducing apparatus 50, after an abnormality is detected by the abnormality detecting circuit 30, a period of time, for example, a maximum of 1 second will be required for transferring the optical head and the magnetic head 4 to complete a re-recording operation. Accordingly, in the optical disc recording and reproducing apparatus 50, the space area of the memory 14 can be secured in case the abnormality detection result is obtained three times until the re-recording operation is completed after abnormality was detected by the abnormality detecting circuit 30. However, in the recording and reproducing apparatus 50, when the recording data stored in the memory 14 is re-recorded on the magneto-optical disc 2, the recording and reproducing apparatus 50 cannot deal with a fourth abnormality detection result because the memory 14 already stores the recording data according to the first to the third abnormality detection results. If the system controller 7 receives another abnormality detection result from the detection circuit 30, the recording data cannot be continuously recorded on the magneto-optical disc 2 and the data stored in the memory 14 is rewritten by the inputted data. In this second embodiment, during re-recording of the recording data, the system controller 7 monitors a monitored result of the detection circuit 51, and decides whether or not the remaining data quantity as the space area of the memory 14 stands at a predetermined value or below. When the remaining quantity in the memory 14 comes to the predetermined value or below, the system controller 7 decides whether or not the re-recording operation is completed, and if a negative result is obtained, the recording operation is stopped, and then an error message is displayed on the display unit 9. When the remaining quantity in the memory 14 comes to the predetermined value or below, the system controller 7 decides whether or not the re-recording operation is completed, and if an affirmative result is obtained, the recording operation is continued.

In this case, accordingly, in the optical disc recording and reproducing apparatus 50, it secures a continuity of the data recorded on the magneto-optical disc 2. Thus, in the optical disc recording and reproducing apparatus 50, when the space area of the memory 14 stands at a predetermined value or below, a recording of discontinuous recording data can be prevented by stopping the re-recording operation in case a track jump occurs frequently.

Figure 16:
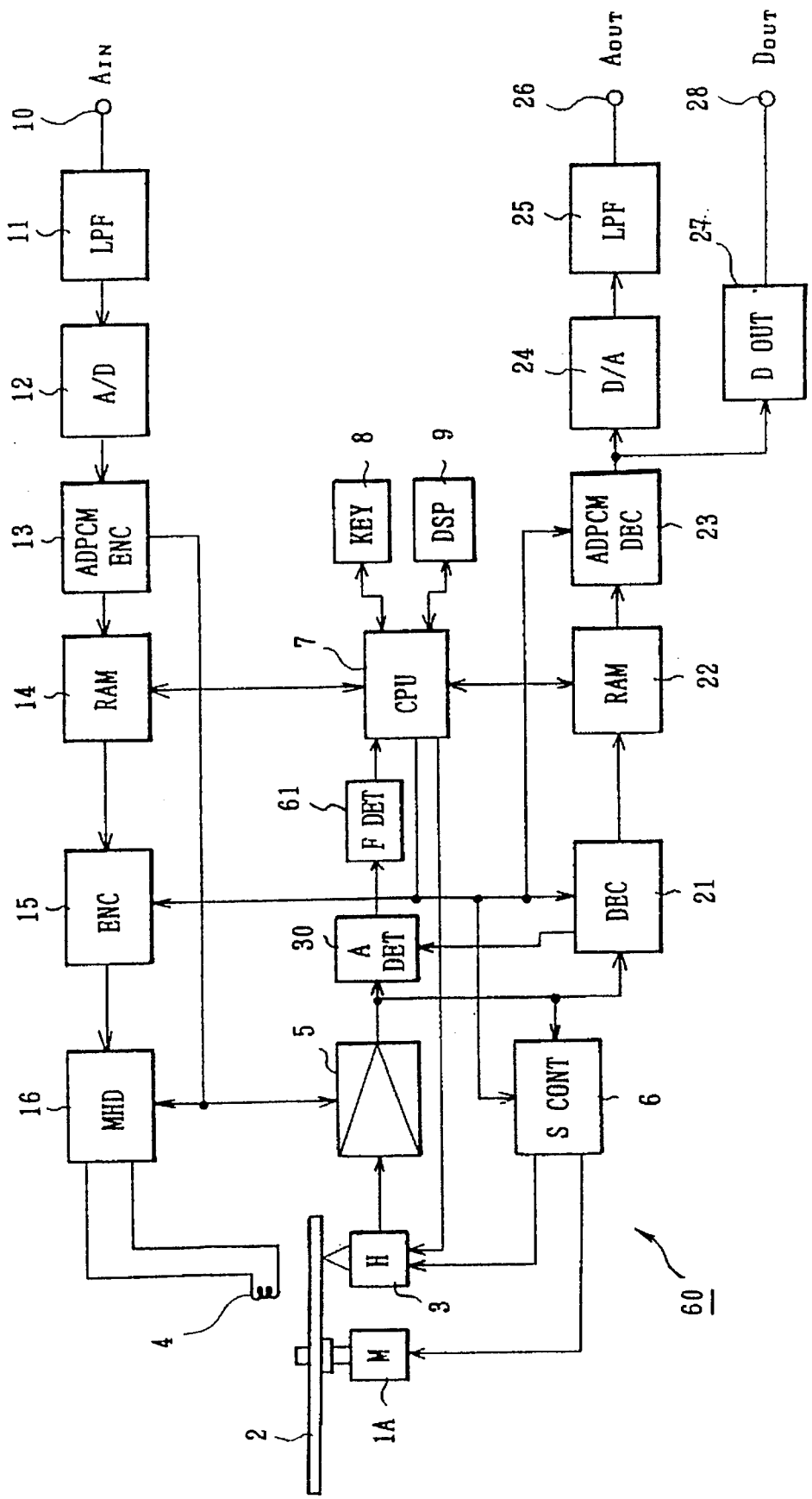
FIG. 16 shows a block diagram of a third embodiment of the present invention.

Next, a third embodiment of the invention will be described in detail with reference to FIG. 16. In FIG. 16, like elements corresponding to those in FIG. 1 are identified by the same reference numerals and will not be described. In FIG. 16, a reference numeral 60 indicates an optical disc recording and reproducing apparatus as a whole. The optical disc recording and reproducing apparatus 60 includes a frequency detecting circuit 61. The frequency detecting circuit 61 detects the frequency of an abnormality detection result from the abnormality detecting circuit 30. The frequency detection circuit 61 counts abnormality detection results per predetermined period and detects a generation frequency of the abnormality detection results.

A recording and a reproducing system of the optical recording and reproducing apparatus 60 are controlled by the system controller 7 as in the case of the optical recording and reproducing apparatus shown in FIG. 1. In the optical recording and reproducing apparatus 60, when the abnormality detection result is obtained from the abnormality detecting circuit 30, the recording operation is interrupted and then the recording data is re-recorded on the magneto-optical disc 2 in the recording mode, and the reproducing operation is repeated in the reproducing mode. Accordingly, in the optical disc recording and reproducing apparatus 60, the recording data can be recorded continuously on the magneto-optical disc 2 and the reproducing data can be outputted continuously via the memory 22 when a track jump occurs.

During re-recording of the recording data, the system controller 7 monitors a detection result of the frequency detecting circuit 61, and when a generation frequency of the abnormality detection result comes to a predetermined value or over, the system controller 7 decides that the recording data cannot be recorded continuously on the magneto-optical disc 2, stops the recording system of the optical disc recording and reproducing apparatus 60, and causes the display unit 9 to display an error message. The predetermined value of the generation frequency of the abnormality detection result is decided according to the capacity of the memory 14. For example, if the memory 14 is capable of storing the recording ADPCM audio data corresponding to 3 seconds of the audio signal AIN and a period of 1 second maximum is required for transferring the optical head and the magnetic head 4 to complete a re-recording operation, the above-mentioned predetermined value is set to 3 abnormality detection results per 3 second period.

In addition, the frequency detecting circuit 61 may detect a period of abnormality detection results from the abnormality detecting circuit 30. In this case, the frequency detecting circuit 61 outputs an output signal to the system controller 7 when the period of the abnormality detection results from the abnormality detecting circuit 30 is shorter than a predetermined period. The predetermined period preset in the frequency detecting circuit 61 is, for example, 3 second, if the memory 14 is capable of storing the recording ADPCM audio data corresponding to 3 seconds of the audio signal AIN and a period of time of 1 second maximum is required for transferring the optical head and the magnetic head 4 to complete a re-recording operation. The frequency detecting circuit 61 may include a reference clock generating circuit and a counter circuit. The counter circuit of the frequency detecting circuit 61 starts to count reference clocks from the reference clock generating circuit of the frequency detecting circuit 61 when a first abnormality detection result is received and stops counting the reference clocks when a second abnormality detection result is received. The period of the abnormality detecting results is decided according to the number of the reference clocks by the system controller 7.

That is, when a track jump or the like arises frequently, the recording data cannot be recorded continuously, therefore the recording operation is stopped in the optical disc recording and reproducing apparatus 60 according to the output signal from frequency detecting circuit 61, thereby preventing a discontinuous recording of the recording data.

In addition, the above described optical recording and reproducing apparatus stops the recording or re-recording operation according to the output signal as the abnormality detection result from the abnormality detecting circuit. The recording and reproducing apparatus may use an output signal from an acceleration detector, for example, disclosed in Japanese Laid-Open Patent No. 61 270665 (JP-A- 61 270665), Japanese Laid-Open Patent No. 02 28563 (JP-A-02 28563) to stop the recording or re-recording operation. In this case, when the system controller detects that an output signal from the acceleration detector becomes a predetermined value, it controls the recording system of the optical disc recording and reproducing apparatus to stop the recording or re-recording operation.

According to the above-described embodiment, a recording operation is stopped according to a generation frequency of the abnormality detection result, thereby preventing a discontinuous recording of the recording data.

In the embodiments described above, the description has referred to the case where recording data is recorded on the magneto-optical disc, however, the invention is not necessarily limited thereto, and is applicable to various types of optical disc recording and reproducing apparatuses. Further, the recording medium is also not limited to a so-called re-writable type optical disc such as a magneto-optical disc only, but is applicable extensively to a write-once type optical disc having a recording layer made by organic dye material or the like. In the optical disc recording apparatus using the write-once type optical disc, the recording data is supplied to a light beam source as a laser diode. The modulated light beam emitted from the light beam source is irradiated to the write-once type optical disc. As a result, the write-once type optical disc is recorded the recording data.

What is claimed is:

1. An optical recording apparatus comprising:
   memory means for storing input data in sequence at a first transmission rate, reading out the stored input data at a second transmission rate which is faster than the first transmission rate, and outputting the data read at the second transmission rate as clusters of recording data;
   recording means for interleaving the recording data and adding cluster connecting sectors, each cluster connecting sector having a data length long enough to cover a distance to rearrange data through interleaving before and after each cluster of recording data and for recording the interleaved data on an optical disc;

detecting means for detecting an abnormality of the recording operation of said recording means and outputting an output signal as an abnormality detected result; and control means supplied with the output signal of the detecting means for controlling said recording means to cease re-recording of the interleaved data interrupted by the abnormality if more than a predetermined number of abnormalities are detected within a predetermined time period.

2. An optical disc recording apparatus according to claim 1, wherein said control means comprises counter means for counting the output signal from said detecting means and timer means supplied with the output signal from the detecting means for timing the predetermined time period beginning with the output signal from said detecting means.

3. An optical disc recording apparatus according to claim 2, wherein the timer means outputs a control signal to the counter means to reset the counter means after the elapse of the predetermined time period.

4. An optical recording apparatus according to claim 1, wherein said control means generates a first control signal which controls said recording means to re-record the recording data read from said memory means on the optical disc when said control means receives the output signal from said detecting means and a second control signal which controls said recording means to stop the re-recording operation to the optical disc when said control means receives the output signal from said detecting means which is obtained at a predetermined number of times within the predetermined period.

5. An optical disc recording apparatus according to claim 1, wherein the predetermined time period is chosen as a function of a buffer capacity of the memory means to ensure that the buffer capacity of the memory means is not exceeded during re-recording.

6. An optical recording apparatus comprising:

memory means for storing input data in sequence at a first transmission rate, and reading out the stored input data at a second transmission rate which is faster than the first transmission rate and outputting the data read at the second transmission rate in bursts of data;

recording means for interleaving the data and recording the interleaved data on an optical disc;

detecting means for detecting an abnormality of the recording operation of the recording means and outputting an output signal as an abnormality detected result; and control means for controlling the recording means to stop the recording operation if the frequency of the output signal from the detecting means exceeds a predetermined minimum value.

* * * * *